3,048,635
PROCESS FOR THE PRODUCTION OF
HEXAMETHYLENE DIAMINE
Heinz Indest, Erlenbach (Main), and Gerhard Meyer, Obernburg (Main), Germany, assignors to Vereinigte Glanzstoff-Fabriken A.G., Wuppertal-Elberfeld, Germany
No Drawing. Filed Dec. 17, 1957, Ser. No. 703,264
Claims priority, application Germany Dec. 17, 1956
6 Claims. (Cl. 260—583)

This invention relates to an improved process for the production of hexamethylene diamine, and more particularly, to the improved continuous conversion of adiponitrile to hexamethylene diamine by catalytic hydrogenation.

High-molecular polyamides such as nylon are prepared by polycondensation of approximately equimolecular amounts of adipic acid and hexamethylene diamine which have been precipitated as hexamethylene diammonium adipate. Both the adipic acid and hexamethylene diamine can be obtained from the same basic source, e.g., benzene, furfural or butadiene. These basic raw materials can be converted by well known reactions to adiponitrile, also referred to as adipic acid dinitrile, having the formula $CN(CH_2)_4CN$. Thus, benzene can be converted to phenol or cyclohexane and subsequently to cyclohexanol which in turn can be oxidized to form adipic acid. The adipic acid is reacted with ammonia to obtain the corresponding amide which is then dehydrated to form adiponitrile. Finally, the adiponitrile is hydrogenated in the presence of a catalyst, under heat and pressure, in order to produce hexamethylene diamine as generally shown by the following equation:

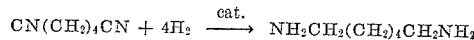
$$CN(CH_2)_4CN + 4H_2 \xrightarrow{\text{cat.}} NH_2CH_2(CH_2)_4CH_2NH_2$$

Several catalysts have been suggested for this hydrogenation reaction, particularly nickel or cobalt or mixtures thereof which are usually precipitated upon a finely divided carrier, and also Raney catalysts. For a continuous conversion of adiponitrile to hexamethylene diamine, the adiponitrile is usually treated in liquid phase by dissolving it in a solvent such as methanol and passing it through a catalyst bed or similar means for obtaining intimate contact with either cobalt, nickel, copper or Raney catalysts. In some cases, especially with nickel catalysts, it has been found desirable to carry out the hydrogenation in the presence of ammonia in order to repress the formation of secondary amines.

The known hydrogenation processes have employed an adiponitrile derived from a basic source such as benzene, as noted above, and the crude adiponitrile is usually purified by a simple distillation or extraction method. For example, aliphatic dinitriles are often purified by distillation under a vacuum. However, the product obtained by this purification procedure will darken or discolor after a period of time and will then be unsuitable for hydrogenation because of contamination of the catalyst with undesired by-products. Other purification procedures have been proposed, therefore, in an attempt to improve a continuous hydrogenation. Thus, the crude adiponitrile has been treated with aqueous solutions of sulfurous acid or a sulfite, especially bisulfite, and subsequently distilled. Other purifications include treatment of the crude adiponitrile with an organic isocyanate or a strong oxy-acid or a so-called "pest acid," followed by distillation. However, even with these methods of purification, it has been very difficult to avoid excessive amounts of by-products during the hydrogenation reaction with corresponding incomplete yields of hexamethylene diamine and a rapid contamination of the catalyst.

In order to obtain a satisfactory yield of hexamethylene diamine according to the known processes, the hydrogenation itself has generally been carried out at pressures of about 200 to 500 atmospheres and at a relatively high reaction temperature of between 65° C. and 140° C., usually above 100° C. With the known catalysts and known methods of purifying adiponitrile, hydrogenation at lower temperatures leads to only a small yield of hexamethylene diamine while a large proportion of the adiponitrile is converted into amino-caponitrile.

Other by-products which likewise decrease the yield of hexamethylene diamine and which also interfere with the purification of this main product, include hexamethylenimine, diaminodihexylamine, and similar higher secondary amines. Still other by-products are obtained which are difficult to separate and which cause a yellow discoloration of the salt prepared by precipitating hexamethylene diamine with adipic acid from solution. The most familiar of this type of by-product is cis-1.2-diamino cyclohexane.

It will be readily seen that the catalytic hydrogenation of adiponitrile to hexamethylene diamine poses a particularly difficult problem when carried out as a continuous process in which the excessive formation of by-products not only reduces the initial yield of hexamethylene diamine but also rapidly poisons or contaminates the catalyst, thus further reducing the yield and generally requiring a frequent regeneration or replacement of the catalyst. Also, an extensive purification of the crude hexamethylene diamine product is required to avoid harmful effects upon the final polyamide product.

One object of the present invention is to provide an improved continuous process for the production of hexamethylene diamine from adiponitrile by catalytic hydrogenation whereby higher yields of hexamethylene diamine can be obtained with only a very small, if not almost complete, avoidance of undesired by-products.

An important object of the invention is to provide a novel purification of the crude adiponitrile as initial reactant such that in combination with a specific highly reactive catalyst and under prescribed temperatures and pressures, the purified adiponitrile can be continuously converted to almost quantitative yields of hexamethylene diamine.

Another object of the invention is to provide an improved continuous process for the catalytic hydrogenation of adiponitrile to hexamethylene diamine wherein the catalyst life is substantially increased and the desired product can be obtained in a high state or purity.

Other objects and advantages of the invention will become more apparent upon a consideration of the following detailed disclosure.

In accordance with the invention, it has now been found that extremely high yields of hexamethylene diamine can be obtained in a continuous process if the crude adiponitrile obtained by conventional processes and distilled, preferably under a vacuum, is first purified in liquid phase by alternate treatment with a basic anion exchange resin and an acidic cation exchange resin, and then hydrogenated in the presence of a liquid ammoniac solvent while being passed in intimate contact with an activated nickel-aluminum catalyst at a temperature of 20–80° C., preferably about 30–60° C., and under superatmospheric pressures of from 100 to 500 atmospheres, preferably about 200 to 350 atmospheres.

The novel procedure of the invention is particularly adapted to continuous operation since the adiponitrile, after purificaion with ion exchange resins, can be led directly into the hydrogenation reaction. Excellent yields of hexamethylene diamine are obtained over an extended period of time. For example, yields of 98% or higher over several weeks operation are not unusual, and the by-products formed are generally very small amounts of amino-capronitrile and only about 0.05 to 1% of secondary amines consisting primarily of diaminodihexylamine and other higher-molecular secondary amines, hexamethylenimine being detected only in trace amounts. The hexamethylene diamine obtained by the process of the invention requires only a single fractional distillation in a vacuum and can then be precipitated with such high purity that it can be used directly with adipic acid for polycondensation to a polyamide. With this pure product, it is impossible to detect those by-products which ordinarily cause a rapid yellow discoloration of the salt formed by hexamethylene diamine and adipic acid upon heating in an aqueous solution.

The remarkable improvement of the invention is largely the result of purifying the initial adiponitrile reactant with alternate and preferably several treatments with anionic and cationic exchange resins. However, it was also surprisingly found that by purification in this manner, the hydrogenation itself could be carried out at relatively lower temperatures and with a very active catalyst such that undesired by-products can be almost completely avoided. Thus, it was discovered that the crude adiponitrile obtained by known conventional processes contains impurities in the form of basic and acidic compounds which cling to or are in some manner closely associated with the crude adiponitrile. These basic and acidic impurities cannot be removed at all, or are only partially removed by former methods of purification, and their presence in the adiponitrile, even in very small amounts, appears to have a large influence upon the course of the hydrogenation reaction, giving unfavorable yields and undesired by-products and generally requiring higher temperatures when using a preferred nickel catalyst. Essentially, the purification step to the invention effectively deionizes the adiponitrile so as to remove a substantial, if not almost complete, proportion of basic and acidic impurties.

With particular reference to the deionization of the crude adiponitrile, it should be noted that conventional purification methods may also be employed, and the adiponitrile from ordinary sources should at least be first subjected to a simple vacuum distillation or fractionation to remove other "non-ionic" impurities in a known manner. The distilled adiponitrile is then deionized, preferably atfer being saturated with a small amount of water, usually in the vicinity of about 6%, by passing it in liquid or dispersed liquid phase through a bed or similar conventional body of ion exchange resins which are usually employed in a granular form, i.e., as small spherical particles. In order to obtain as complete a deionization as possible the adiponitrile is preferably treated several times in alternating sequence and in any order with a basic anion exchange resin and an acidic cation exchange resin, the resins of each type being advantageously arranged in several paired columns. It is most advantageous to employ those ion exchange resins which are characterized as being strongly basic or strongly acidic.

Thus, the preferred strongly basic anion exchange resins are those which contain quaternary ammonium groups such as can be obtained by copolymerizing a mixture of styrene and divinyl benzene, haloalkylating the resulting polymer, and then quaternizing the product, e.g., a chloromethylated styrene-divinyl benzene, with a suitable tertiary amine. Other methods of introducing quaternary ammonium groups into the exchange resin molecule are well known in the art. As examples of strongly basic anion exchange resins for use in accordance with the invention, commercial products can be obtained under the trade names Lewatit MN, Lewatit MJH, Amberlite IRA–410, and Dowex 2. The preparation of the latter two exchange resins is disclosed in U.S. Patent No. 2,614,099.

The strongly acidic cation exchange resins which are suitable for use in the process of the invention can also be obtained commercially under such trade names as Lewatit S100, Lewatit CNO, Amberlite 1R–120, Nalcite HCR, and Dowex 50. These strongly acidic cation exchange resins are usually monofucntional sulfonated polymeric resins, such as can be obtained by sulfonating a copolymerized styrene-divinyl benzene resin as disclosed in U.S. Patent No. 2,366,007, to obtain a product corresponding, for example, to Dowex 50.

Other known ion exchange resins having similar properties to the above mentioned strongly basic anion exchange resins and strongly acidic cation exchange resins will be easily recognized by those skilled in the art as being useful within the scope of the present invention. Generally speaking, it is desirable to employ those ion exchange resins which are commercially available and which are most easily regenerated according to many known procedures.

The deionized adiponitrile in a liquid ammoniac solvent can be subjected directly to hydrogenation, and may contain the water originally present during deionization as well as other solvents, e.g., methanol. An excess of ammonia is desired in order to inhibit or repress the formation of secondary amines, and will be in the liquid phase under the high pressures employed. By employing a highly active nickel-aluminum alloy catalyst together with the high degree of purification provided by deionization of the adiponitrile, it is possible to carry out the hydrogenation at only moderately raised temperatures of 20° C. to 80° C., and preferably about 30° C. to 60° C., such that the yield of hexamethylene diamine is considerably increased while formation of by-products is almost completely avoided. By contrast, where nickel-containing catalysts have previously been employed with ordinary adiponitrile purification procedures, relatively high amounts of by-products, causing discoloration, are obtained under similar and usually higher temperature conditions.

The preferred catalyst for the continuous process of the invention is a highly active nickel-aluminum alloy, preferably having a nickel content of about 40–60%, the remainder being aluminum. This contact catalyst is most advantageously employed in a porous granular form having a grain or particle size of about 2 to 10 mm., particle size generally being determined by accepted principles according to the volume or dimensions of the reaction vessel which can be a cylindrical tube, column or the like. The nickel-aluminum alloy is activated by the so-called "etching process" in which the granular particles are treated at temperatures of about 20° to 80° C. with a dilute alkaline solution, e.g., with a 5–10% aqueous alkali hydroxide solution. After this light etching treatment, the catalyst is washed with water until alkali is no longer removed therefrom.

The catalyst can be activated after being firmly mounted as a fixed bed in the hydrogenation reaction vessel. Prior to hydrogenation, the apparatus should be rinsed with nitrogen and all access of air avoided, after which hydrogen can be introduced to obtain the desired hydrogen pressure of about 100–500, preferably 200–350, atmospheres. The deionized adiponitrile dissolved in several times its weight of liquid ammonia, which can also contain other solvents, e.g., water or an alcohol, is continuously introduced so as to flow in intimate contact with the granular catalyst. Excess hydrogen is likewise continuously introduced in intimate admixture with the adiponitrile after being compressed to the reaction pressure by a suitable pump which also acts to circulate the hydrogen.

The temperature of the hydrogenation should be precisely regulated and accurately maintained during the continuous reaction by any conventional procedure, e.g., by regulation of the flow rate and temperature of the reactants. Thus, cold hydrogen and cold liquid ammoniac solvent solution can be introduced into principal reaction zones of the catalyst bed, and, if necessary, various mixing devices can be employed to ensure a uniform temperature over the entire catalyst bed.

The continuous process of the invention can be conducted with a daily throughput of adiponitrile in a volume of from about 1 to 2 times the catalyst volume, and very excellent yields of about 97–99% hexamethylene diamine can be achieved. The catalyst remains effective for about 30 to 60 days if the adiponitrile has been properly deionized so as to remove the basic and acidic impurities which otherwise contaminate the catalyst or cause excessive formation of contaminating by-products. After the activity or efficiency begins to decline, the liquid in the reaction vessel can be removed, the pressure released, and hydrogen displaced by washing out the vessel with an inert gas, such as nitrogen. The catalyst can then be activated again, as described above, by treatment with dilute alkali hydroxide in aqueous solution. This reactivation of the catalyst can be repeated about 7 to 10 times, thereby providing a total catalyst life or extended period of operation of about 300 days and above without any substantial impairment of the catalyst efficiency and high yields of hexamethylene diamine.

On the other hand, if the same continuous process is carried out under identical conditions except that the adiponitrile is purified only by the conventional fractional distillation, then the catalyst efficiency rapidly declines and must be regenerated by superficial etching after every 5 to 10 days, even though the distillation purification procedure is very carefully carried out. The yield of hexamethylene diamine likewise declines rapidly, and there is a gradually increasing yield of excess by-products such as amino-capronitrile and various secondary amines which will gradually increase the discoloration or yellowing of the final polyamide. Thus, it will be readily apparent that quality control of the desired products is very poor when continuous operation is carried out by the known methods. Furthermore, operation is more frequently interrupted because of the relatively short catalyst life, thereby requiring a greater expenditure of labor and a loss of valuable on-stream time in the utilization of the apparatus.

The following example together with a comparative test represents a preferred procedure to be followed in accordance with the continuous process of the invention and will provide a particularly clear illustration of the advantages and important technical improvements of the invention. It will be understood, of course, that the example is illustrative only and not exclusive.

*Example*

Adiponitrile which has been previously purified by vacuum distillation is first saturated with about 6% by weight of water at about 20° C. This aqueous dispersion is passed through a series of ion exchange columns with a throughput of about 0.5 kilograms per hour based on the adiponitrile and then through a hydrogenation reaction vessel.

In order to deionize the distilled adiponitrile, it is conducted upwardly in alternate sequence through four pairs of columns, each pair consisting of a cation exchange column and an anion exchange column having a resin or bed volume of about 1 liter, the adiponitrile passing first through the cation exchange column and then through the anion exchange column of each pair before proceeding to the next pair of columns. In sequence, therefore, the cation exchange columns can be identified by the numerals 1, 3, 5 and 7, while the anion exchange columns can be identified by the numerals 2, 4, 6 and 8. As the cation exchange resin, there is employed the product sold under the trade name Dowex 50 which is a highly acidic cation exchange resin consisting of a sulfonated copolymerized styrene-divinyl benzene resin in granular form. The anion exchange resin employed is sold under the trade name Dowex 2 and consists of a chloromethylated copolymerized styrene-divinyl benzene resin quaternized with dimethylethanolamine which is also in granular form.

In the continuous purification, the first pair of ion exchange columns, i.e., 1 and 2, becomes exhausted or spent after the passage of about 20 to 50 kilograms of adiponitrile. Therefore, an additional two pairs of cation and anion exchange columns are also employed to provide a means of continuing the deionization while regenerating the exhausted columns. Thus, after the exchange resins in the first pair of columns have become saturated with acidic and basic impurities, they can be removed from the flow stream and two fresh or regenerated columns added or engaged in the flow stream in the last position with respect to the direction of flow of adiponitrile.

For regeneration, adiponitrile remaining in the columns is removed by forcing water through the exchange resin bed, and the particular resins then regenerated in the usual manner, e.g., by treatment with a mineral acid such as HCl or $H_2SO_4$ in the case of the acidic cation exchange resin or by treatment with caustic soda or similar strongly alkaline wash liquid in the case of the basic anion exchange resins. Finally, the regenerated beds are thoroughly washed with water until all the acid or alkali is removed.

A clear and colorless adiponitrile is obtained by this deionization purification and is hydrogenated in an ammoniac solvent without further distillation or removal of water by intimate contact with an activated porous nickel-aluminum alloy catalyst at a temperature of about 40° C. and under a pressure of about 300 atmospheres, the catalyst being suitably arranged as a bed in a hydrogenation reaction vessel consisting of a vertical tube or cylinder having an inside diameter of 52 mm. and a length of 2 meters. About 3.8 liters of the catalyst in granular form is arranged in the tube.

The catalyst employed is a granulated nickel-aluminum alloy consisting of 50% nickel and 50% aluminum which was previously activated by a superficial etching with a 10% caustic soda solution at 50° C. Dissolution of aluminum provides a porous catalyst which can be further etched, i.e., reactivated, when it becomes necessary to regenerate the catalyst. After activation, the catalyst is washed with water until alkali can no longer be detected in the wash solution.

A mixture of one part by weight of the purified and deionized adiponitrile with four parts by weight of an aqueous liquid ammoniac solvent is pumped over the 3.8 liter catalyst bed to obtain a daily throughput of about one volume of adiponitrile to one volume of catalyst. Simultaneously, hydrogen compressed under a pressure of 300 atmospheres is conducted through the column at a rate of 16 m.$^3$/hr. (measured at 7.35 mm. Hg and 15° C.) by means of a gas-circulating pump. The hydrogen consumed during the process is replaced with the aid of a compressor to maintain a constant pressure of 300 atmospheres.

The reaction product is separated from the gaseous phase in a high-pressure separator, the liquid ammonia employed as a solvent being distilled off, after releasing the hydrogen pressure, at a pressure of 20 atmospheres for reuse. The remaining reaction product is subjected to a single fractional distillation over a 3 meter high vacuum column filled with V4A-coils to obtain a highly purified hexamethylene diamine having a melting point of 41.4° C., and being substantially free of contaminating or yellowing by-products.

The average yield obtained over a period of 30 days continuous operation, during which the catalyst was not reactivated, amounted to 98.7% of hexamethylene diamine, 0.14% of hexamethylenimine, 0.38% of diamino-dihexylamine and other higher secondary amines, and 0.71% of amino-capronitrile. Even these small quantities of impurities are substantially completely removed by the single distillation so that the pure hexamethylene diamine product, either in solid form or dissolved in a 75% aqueous solution, can be stored for several months without discoloration.

Comparative Example

For comparison, the continuous process was carried out under the identical conditions and with identical reactants of the preceding example except that the initial deionization of the distilled adiponitrile was omitted. It was found that the catalyst must be reactivated after only 9 days continuous operation, and even after 5 days a rapid decline in the conversion of adiponitrile to about 70% hexamethylene diamine was observed. The average yield of hexamethylene diamine over the full period amounted to only 85%, while in addition to relatively large quantities of amino-capronitrile, about 3% of secondary amines were also formed. Therefore, it was necessary to extensively purify the smaller yield of hexamethylene diamine by several fractional distillations in order to approach the purity obtained in the preceding example.

The present invention provides a marked improvement in the commercially important continuous conversion of adiponitrile to hexamethylene by catalytic hydrogenation. Whereas previous processes, particularly those employing the more active nickel-containing catalysts, produce relatively high amounts of troublesome and discoloring by-products, the continuous process set forth herein permits the employment of highly active nickel-aluminum alloy catalysts having a very long effective life for the production of almost quantitative yields of hexamethylene diamine. The continuous process of the invention is also much easier to control in order to obtain a product with the uniform, stable and very pure properties required in the production of polyamides from adipic acid and hexamethylene diamine.

The invention is hereby claimed as follows:

1. A continuous process for the production of hexamethylene diamine which comprises a two-stage process of first subjecting a distilled adiponitrile to repeated alternate treatment with a strongly basic anion exchange resin and a strongly acidic cation exchange resin to remove catalyst-contaminating impurities from said adiponitrile, and subsequently hydrogenating the deionized adiponitrile in a liquid ammoniac solvent and in intimate contact with an activated nickel-aluminum alloy catalyst wherein the alloy has a nickel content of 40 to 60% at a temperature of 20° C. to 80° C. and a pressure of 100 to 500 atmospheres.

2. A continuous process for the production of hexamethylene diamine which comprises a two-stage process of first subjecting a distilled adiponitrile saturated with water to repeated alternate treatment with a strongly basic anion exchange resin and a strongly acidic cation exchange resin to remove catalyst-contaminating impurities from said adiponitrile, and subsequently hydrogenating the deionized adiponitrile in a liquid ammoniac solvent and in intimate contact with a granular porous activated nickel-aluminum alloy catalyst wherein the alloy has a nickel content of from 40 to 60 percent at a temperature of about 30° C. to 60° C. and under a pressure of about 200 to 350 atmospheres.

3. A continuous process for the production of hexamethylene diamine which comprises a two-stage process of first subjecting a distilled adiponitrile saturated with water to repeated alternate treatment with a strongly basic quaternary ammonium anion exchange resin and a strongly acidic sulfonated cation exchange resin to remove catalyst-contaminating impurities from said adiponitrile, and subsequently hydrogenating the deionized adiponitrile dissolved in an aqueous liquid ammoniac solvent and in intimate contact with a granular porous activated nickel-aluminum alloy catalyst wherein the alloy has a nickel content of from 40 to 60 percent at a temperature of about 30° C. to 60° C. and under a pressure of about 200 to 350 atmospheres.

4. A continuous process for the production of hexamethylene diamine which comprises a two-stage process of first subjecting a distilled adiponitrile saturated with water to repeated alternate treatment with an anion exchange resin consisting of a haloalkylated copolymerized styrene-divinyl benzene resin quaternized with a tertiary amine and a cation exchange resin consisting of a sulfonated copolymerized styrene-divinyl benzene resin to remove catalyst-contaminating impurities from said adiponitrile, and subsequently hydrogenating the deionized adiponitrile dissolved in an aqueous liquid ammoniac solvent and in intimate contact with a granular porous activated nickel-aluminum alloy catalyst wherein the alloy has a nickel content of from 40 to 60 percent at a temperature of about 30° C. to 60° C. and under a pressure of about 200 to 350 atmospheres.

5. The process of claim 4 wherein the anion exchange resin consists of a granular chloromethylated copolymerized styrene-divinyl benzene resin quaternized with dimethylethanolamine and the cation exchange resin consists of a granular sulfonated copolymerized styrene-divinyl benzene resin.

6. A process as claimed in claim 1 wherein the adiponitrile in said first stage is saturated with about 6% by weight of water.

References Cited in the file of this patent

UNITED STATES PATENTS

| | | |
|---|---|---|
| 2,160,578 | Schmidt | May 30, 1939 |
| 2,166,151 | Howk | July 18, 1939 |
| 2,284,525 | Larchor et al. | May 26, 1942 |
| 2,436,368 | Weber et al. | Feb. 17, 1948 |
| 2,444,589 | Blann | July 26, 1948 |

OTHER REFERENCES

Calmon et al.: "Ion Exchangers in Organic and Biochemistry," Interscience Publishers, Inc., New York, N.Y. (1957), pages 640–643.